United States Patent [19]
Oguma

[11] Patent Number: 5,936,768
[45] Date of Patent: Aug. 10, 1999

[54] OPTICAL PASSIVE DEVICE FOR AN OPTICAL FIBER AMPLIFIER AND THE OPTICAL AMPLIFIER

[75] Inventor: Takefumi Oguma, Tokyo, Japan

[73] Assignee: NEC Corporation, Tokyo, Japan

[21] Appl. No.: 08/713,855

[22] Filed: Sep. 13, 1996

[30] Foreign Application Priority Data

Sep. 20, 1995 [JP] Japan ................................. 7-241327

[51] Int. Cl.⁶ ................ G02B 5/30; G02B 6/00
[52] U.S. Cl. ................ 359/484; 359/495; 359/502; 372/703; 385/11
[58] Field of Search ..................... 359/484, 483, 359/494, 495, 502; 385/11; 372/703

[56] References Cited

U.S. PATENT DOCUMENTS

| | | | |
|---|---|---|---|
| 4,239,329 | 12/1980 | Matsumoto | 385/11 |
| 5,033,830 | 7/1991 | Jameson | 359/484 |
| 5,089,786 | 2/1992 | Tamura | 359/484 |
| 5,191,467 | 3/1993 | Kapany et al. | 385/11 |
| 5,267,078 | 11/1993 | Shiraishi et al. | 359/494 |
| 5,471,340 | 11/1995 | Cheng et al. | 359/484 |
| 5,499,307 | 3/1996 | Iwatsuka | 385/11 |
| 5,574,596 | 11/1996 | Cheng | 359/495 |
| 5,729,377 | 3/1998 | Bergmann | 359/495 |

FOREIGN PATENT DOCUMENTS

| | | | |
|---|---|---|---|
| A 55-159245 | 12/1979 | Japan | 359/484 |
| A 55-103518 | 8/1980 | Japan | 359/484 |
| A 55-103519 | 8/1980 | Japan | 359/484 |
| A 63-205636 | 8/1988 | Japan | 359/484 |
| 1285782 | 8/1972 | United Kingdom | 359/484 |
| WO 94/09400 | 4/1994 | WIPO | 359/484 |

OTHER PUBLICATIONS

Masafumi Koga, et al., "Polarization–Insensitive High–Isolation Optical Nonreciprocal Device for Circulator Application", NTT Transmission Systems Laboratories, pp. 1–6.

*Primary Examiner*—Thong Nguyen
*Assistant Examiner*—John Juba, Jr.
*Attorney, Agent, or Firm*—Whitham, Curtis & Whitham

[57] ABSTRACT

An optical device of the invention having a first doubly refracting crystal plate of parallel plate type whose crystal optical axis is inclined in relation to the optical axis of an incident light, a second doubly refracting crystal plate of parallel plate type which is equal to the first doubly refracting crystal plate of parallel plate type in inclination of the crystal optical axis inclined in relation to the optical axis and in plate thickness, and a Faraday rotator which is disposed between the first and the second doubly refracting crystal plate of parallel plate type and. turns by 90 degrees an incident linear polarized light which is in the optical axis direction of the incident light and has wavelength of the incident light. The invention can provide a polarization-independent optical isolator which is small-sized and capable of selecting a direction of the input/output optical fiber at will. And the invention can compose an optical circulator capable of setting the number of input/output ports at will. The invention provides a polarization-independent optical isolator which is small-sized and capable of selecting directions of input/output optical fibers at will and an optical circulator which is small-sized and capable of setting the number of input/output ports at will.

8 Claims, 7 Drawing Sheets

OPTICAL PASSIVE DEVICE FOR AN OPTICAL FIBER AMPLIFIER AND THE OPTICAL AMPLIFIER

BACKGROUND OF THE INVENTION

1. Field of the Invention

The present invention relates to an optical passive device such as a polarization-independent optical isolator, a polarization-independent optical circulator, and the like used in an optical fiber amplifier and the like, and an optical fiber amplifier using these devices.

2. Description of the Related Art

In recent years, with the practical use of an optical fiber amplifier, demand for a polarization-independent optical isolator for preventing deterioration of its S/N ratio caused by a reflected returning light has increased.

A polarization-independent optical isolator is composed of a birefractive material such as rutile and the like, a Faraday rotator such as YIG and the like. A polarization-independent optical isolator separates an optical path into a forward path and a backward path which are different from each other, as using an optical non-reciprocity of a Faraday rotator. This optical isolator is required that it has a low insertion loss to a forward light and a high insertion loss to a backward light.

Many of polarization-independent optical isolators currently in practical use are of a type called an inline type in which an input and an output optical fiber are opposite to each other by 180 degrees in relation to their forward direction. In an existing polarization-independent optical isolator, an input and an output optical fiber are opposite to each other by 180 degrees in relation to their forward direction. Since an optical fiber cannot be bent usually with a radius of 30 mm or less, it is necessary to have a margin for a bending radius (about 30 mm) of the fiber at both sides of the optical component. This becomes an obstacle to miniaturization of an optical fiber amplifier in implementation.

For the purpose of miniaturization of an optical fiber amplifier, an optical component in which a polarization-independent optical isolator, an optical branching film, a PD device, and the like are integrated has been implemented. The integrated optical component also becomes an obstacle to miniaturization of an optical fiber amplifier since it needs to have a margin for a bending radius of the fiber at both ends of it in implementation similarly to an optical amplifier using an isolator of inline type shown in FIG. 2.

Up to now, an optical circulator having three or four ports has been proposed as an optical circulator. An existing optical circulator is composed of two polarization beam splitters, a 45-degree Faraday rotator, and an optical rotator. In an existing configuration, in case of composing an optical circulator of four ports, input/output terminals are disposed in four directions on the optical circulator body. In such a configuration as this, since a margin for a bending radius of the optical fiber is provided in the four directions in implementation, a large space is needed for implementation.

As a configuration to improve this, there is an optical circulator composed of a birefringent crystal, a 45-degree Faraday rotator, and an optical rotator. In case of composing an optical circulator of four ports according to this configuration, input/output terminals are disposed in two directions opposite to each other by 180 degrees on the optical circulator body.

In any of the above-mentioned configurations of optical passive components, since the optical input/output terminals are opposite to each other by 180 degrees, a margin for a bending radius is necessary at both sides of the optical component. This is an obstacle to miniaturization of an optical fiber amplifier in implementation.

Furthermore, in an existing optical circulator, the number of ports to be provided on an optical circulator is limited to four and it is difficult to implement an optical circulator of more ports than this.

SUMMARY OF THE INVENTION

A first object of an optical passive device for an optical fiber amplifier of the present invention is to make it possible to compose a polarization-independent optical isolator or an optical circulator having input/output terminals disposed at the same side. A second object of the invention is to attain an optical circulator capable of having an infinite number of optical input/output terminals instead of an existing optical circulator having input/output terminals limited to three or four up to now.

A polarization-independent optical isolator according to the present invention comprises a first optical input/output terminal, a first-birefringent crystal plate which has a crystal optical axis inclined in relation to the optical axis of an incident light inputted from the first input terminal and outputs linear polarized light composed of an ordinary light and an extraordinary light obtained by birefracting the incident light, and a second birefringent crystal plate which is equal to the first birefrigent crystal in inclination of its crystal optical axis inclined in relation to the incident light and in plate thickness and which birefracts the incident light. Furthermore, it is provided with a polarization rotator which is disposed between the first birefringent crystal plate and the second birefringent crystal plate and rotates by 90 degrees a linear polarized light transmitted through the first birefringent crystal plate, a reflection film which is disposed at the side of the second birefringent crystal plate which side is opposite to the polarization rotator and outputs a reflected light of the incident light, and a second optical input/output terminal for optically coupling the reflected light through the second birefringent crystal plate, the polarization rotator, and the first birefringent crystal plate.

An incident light is doubly refracted into an ordinary ray and an extraordinary ray by means of the first birefractive crystal plate of parallel plate type, and its polarizing direction is rotated by 90 degrees by a Faraday rotator. Each rotated linear polarized light comes to be in the same state as the original incident light by being transmitted through the second birefringent crystal plate of parallel plate type. At this time, however, it is parallel shifted by a distance from the original incident position of the incident light. This light is, furthermore, reflected by a reflection film and is transmitted again through the second birefractive crystal plate, the polarization rotator, and the first birefringent crystal plate. As the result, the light outputted from the first birefringent crystal plate is shifted furthermore from the original position of the incident light. The second optical input/output terminal is disposed at the position where the output light is optically coupled. Therefore, the light outputted from the first optical input/output terminal is coupled with the second optical input/output terminal through the above-mentioned path.

On the other hand, the light outputted from the second optical input/output terminal is outputted from the first birefractive crystal plate through the optical path as being shifted according to the same principle. This position is shifted to the opposite side to the first optical input/output terminal. Therefore, the light outputted from the second optical input/output terminal, namely, the backward light is not optically coupled with the first optical input/output terminal and can function as an optical isolator.

And a polarization-independent optical circulator according to the invention is implemented by applying the fundamental principle of the above-mentioned polarization-independent optical isolator. In addition to the first and the second optical input/output terminal, a third optical input/output terminal is disposed at the side of the second birefringent crystal plate where a reflection film was formed in the previous example but is not formed in this case. In such a configuration as this, a light outputted from the first optical input/output terminal is coupled to the third optical input/output terminal and a light outputted from the third optical input/output terminal is coupled to the second optical input/output terminal. Therefore, it can function as an optical circulator.

Other optical input/output terminals are disposed one after another at the same intervals as the interval between the first optical input/output terminal and the second optical input/output terminal at the opposite side to the first optical input/output terminal in relation to the second optical input/output terminal. In the same way, other optical input/output terminals are disposed in parallel with the third optical input/output terminal. By doing so, an optical circulator provided with more optical input/output terminals can be composed.

BRIEF DESCRIPTION OF THE DRAWINGS

The above and other objects, features and advantages of the present invention will become more apparent from the following detailed description where taken in conjunction with the accompanying drawings wherein.

DETAILED DESCRIPTION OF THE PREFERRED EMBODIMENTS

Prior to describing an optical passive device for an optical fiber amplifier of the present invention, first, configuration of an optical fiber amplifier of the prior art is briefly described. In order to make it easy to understand the present invention, configuration of an optical isolator and an optical circulator according to the prior art is described with reference to FIGS. 2 to 5.

Figure 1:
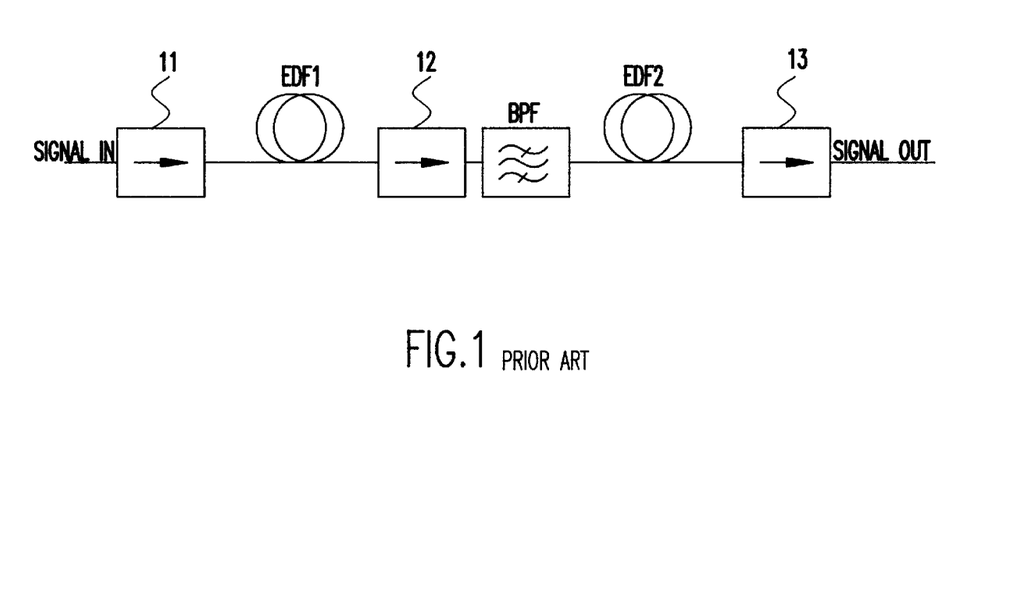
FIG. 1 is a figure showing the fundamental configuration of an optical fiber amplifier of the prior art.

FIG. 1 is a figure showing an example of optical fiber amplifiers of the prior art. Two erbium-doped fibers EDF1 and EDF2 for optical amplification are connected in series to each other. Each of the erbium-doped fibers EDF1 and EDF2 is connected to an exciter light source through an optical multiplexer (not illustrated). An excitation light outputted from the exciter light source and a signal light are multiplexed through the optical multiplexer and inputted into the respective erbium-doped fibers, and the signal light is amplified. In order to prevent generation of a noise caused by a returning light from a connection point, optical isolators 11, 12, and 13 for preventing a returning light are usually disposed at the input and output sides of the erbium-doped fibers EDF1 and EDF2. An optical band-pass filter to transmit only a light having wavelength of the signal light is disposed at the input side of the erbium-doped fiber EDF2.

Since an optical isolator used in an optical fiber amplifier must prevent a returning light regardless of a polarization state of an incident light, the optical isolator needs to be of polarization-independent type. And it needs to be suitable for miniaturization of the optical fiber amplifier.

Figure 2:
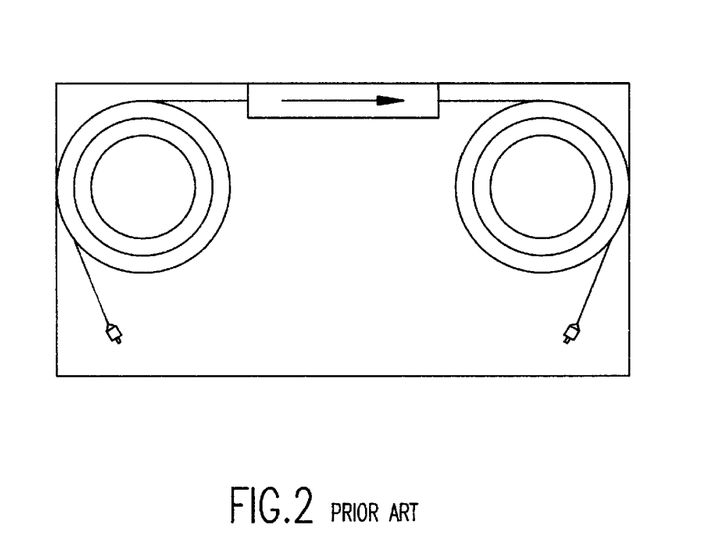
FIG. 2 is a figure showing an example of optical fiber amplifiers implemented by applying an existing optical isolator.

FIG. 2 is a figure showing an example of optical isolators for an optical fiber amplifier according to the prior art. Many of existing polarization-independent optical isolators are of a type called an inline type in which the input and output optical fibers are opposite to each other by 180 degrees in direction. In an existing polarization-independent optical isolator, the input and output optical fibers are opposite to each other by 180 degrees, in direction. Since an optical fiber cannot be bent usually with a radius of 30 mm or less, a margin for a bending radius (about 30 mm) is necessary at both sides of the optical component. This becomes an obstacle to miniaturization of an optical fiber amplifier in implementation.

Figure 3:
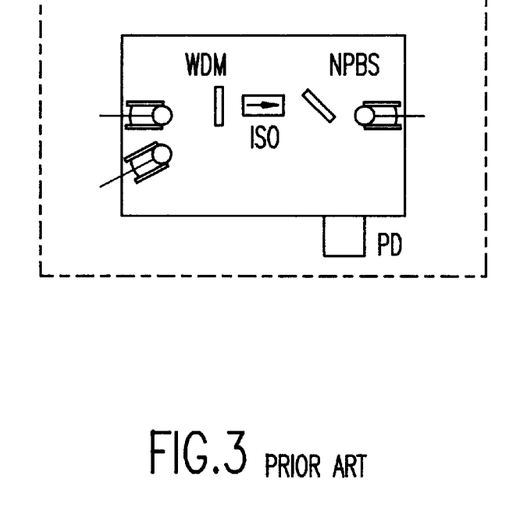
FIG. 3 is a figure showing configuration of an example of existing composite optical components.

On the other hand, for the purpose of miniaturization of an optical fiber amplifier, an optical component in which a polarization-independent optical isolator, an optical branching film, a PD device, and the like are integrated has been manufactured as a product. For example, as shown in C-214 of the fall convention, 1993 of the Institute of Electronics, Information, and Communication Engineers of Japan, a polarization-independent optical isolator in which optical components having plural functions are integrated has been proposed. FIG. 3 shows an existing optical passive device for an optical fiber amplifier in which plural components are integrated. However, since a composite optical component also needs a margin for a fiber bending radius at both ends of it when mounting an optical isolator of an inline type, this becomes an obstacle to miniaturization of an optical fiber amplifier.

On the other hand, an optical circulator may be used in an optical fiber amplifier. An optical circulator has three or more optical input/output terminals. A light inputted into the first optical input/output terminal is outputted to the second optical input/output terminal, and a light inputted into the second optical input/output terminal is outputted to the third optical input/output terminal. In such a way as this, the optical circulator is provided with a fundamental configuration where the optically inputted and outputted terminals do not make a pair but the relation between the input and the output terminal is shifted one after another.

Figure 4:
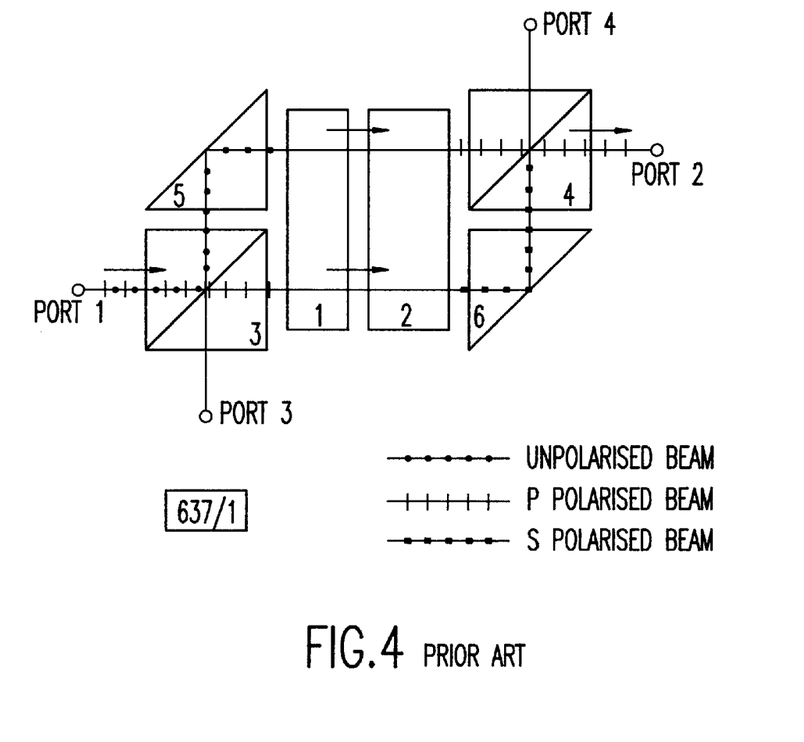
FIG. 4 is a figure showing configuration of an example of optical circulators according to the prior art.
Figure 5:
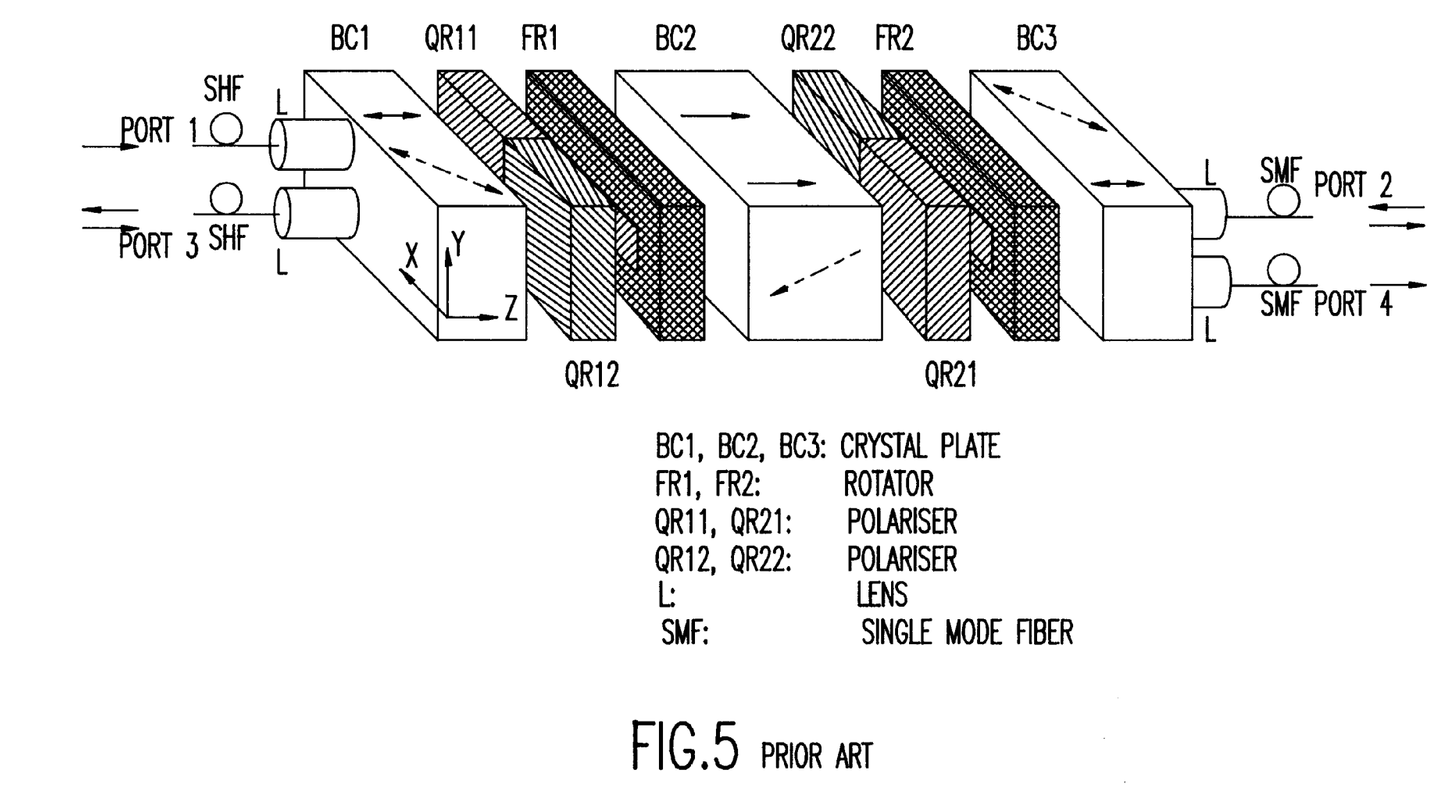
FIG. 5 is a figure showing configuration of another example of optical circulators according to the prior art.

Up to now, an optical circulator having three or four ports has been proposed as an optical circulator. FIGS. 4 and 5 show configurations of existing optical circulators. FIG. 4 shows a configuration proposed in Japanese Publication, Tokuganshou No.54-2033 (Jan. 9th, 1979), which is composed of two polarization beam splitters, a 45-degree Faraday rotator, and an optical rotator. In this configuration, in case of composing an optical circulator of four ports, input/output terminals are disposed in four directions on the optical circulator body. However, since it is necessary to make a margin for an optical fiber bending radius in the four directions when implementing the optical circulator, a large space is needed in implementation. It is another existing example shown in FIG. 5 that has improved this problem.

FIG. 5 shows an optical circulator proposed in a study meeting CS91-9 (OCS91-9) of the Institute of Electronics, Information, and Communication Engineers of Japan, which is composed of birefringent crystal plates, 45-degree Faraday rotators, and optical rotators. In case of composing an optical circulator of four ports according to this configuration, input/output terminals are disposed in two directions opposite to each other by 180 degrees on the optical circulator body.

As described above, a composite optical component having an existing polarization-independent optical isolator as shown in FIGS. 2 and 3 needs a margin for a bending radius at both sides of the optical component, since the optical input/output terminals are opposite to each other by 180 degrees in it. This becomes an obstacle to miniaturization of an optical fiber amplifier in implementation. An existing optical circulator shown in FIG. 4 or 5 places a limit upon an optical circulator of four ports, and it is difficult to implement an optical circulator of more ports than this. The configuration of existing optical passive devices is not sufficient in miniaturization as well as in extension of their functions.

Next, a polarization-independent optical isolator and an optical circulator according to the configuration of an optical passive component for an optical fiber amplifier of the present invention is described in detail with reference to the drawings.

FIG. 6 shows a detailed configuration and a principle of operation of a polarization-independent optical isolator and an optical circulator according to the invention. Polarizers 1 and 2 are made of birefringent material such as rutile and the like and are equal to each other in thickness, and are disposed in parallel with each other so as to be equal in separating direction of a polarized light (extraordinary light) having a polarizing direction perpendicular to the crystal axes 5 and 6.

A Faraday rotator 3 is disposed between the polarizers 1 and 2. The Faraday rotator is made of yttrium iron garnet (YIG) and the like, and its thickness is adjusted so that its Faraday rotation angle may be 90 degrees in a wavelength in use. An antireflection film is deposited on the polarizer 1, the Faraday rotator 3, and the Faraday rotator side of the polarizer 2. An optical film 4 is deposited on the opposite side to the antireflection film side of the polarizer 2.

An optical isolator shown in FIG. 6 is of polarization-independent type and a reflection film showing the total reflection in an optical wavelength in use is deposited on it as the optical film 4. FIG. 6(a) is a perspective view of the optical isolator. FIG. 6(b) shows a locus of an incident light inputted from an optical fiber 7 in case of seeing the optical isolator in FIG. 6(a) from the side direction, and FIG. 6(c) shows a polarized state of the incident light inputted from the optical fiber 7 in case of seeing the optical isolator in FIG. 6(a) from the front direction.

Figure 6A:
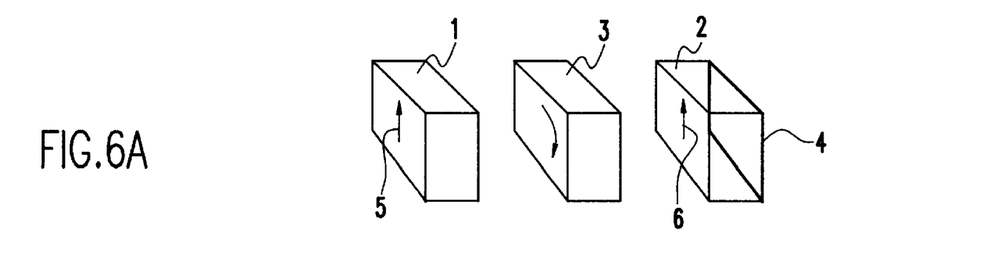
FIGS. 6(a)–6(e) are figures showing a principle of operation of a polarization-independent optical isolator and an optical circulator which are an embodiment of an optical passive device for an optical fiber amplifier of the present invention.
Figure 6B:
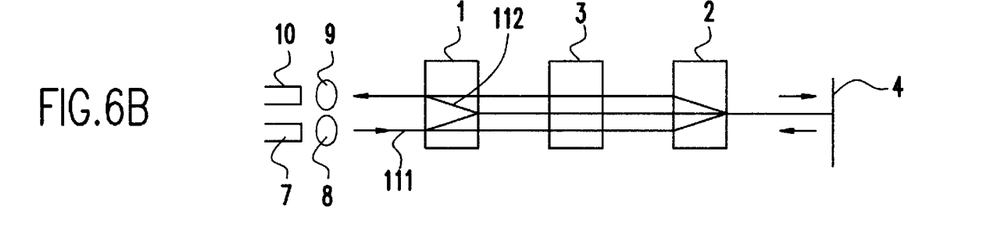
Figure 6C:
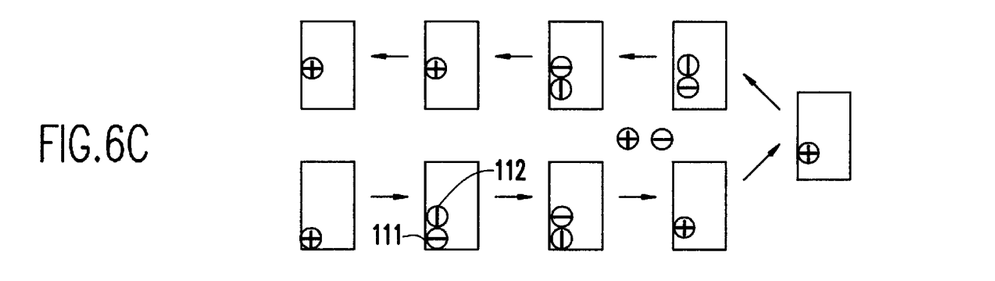
Figure 6D:
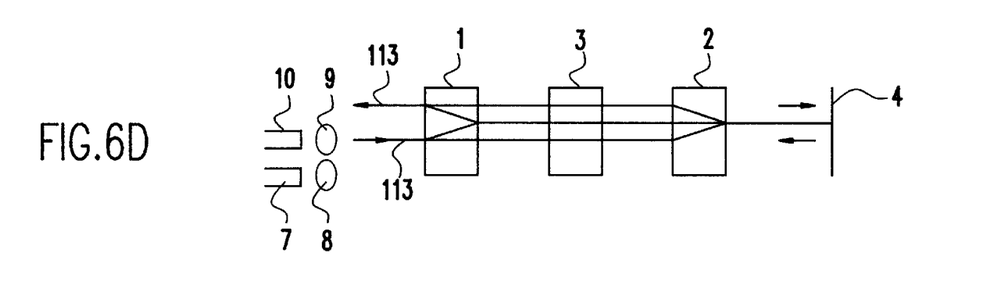
Figure 6E:
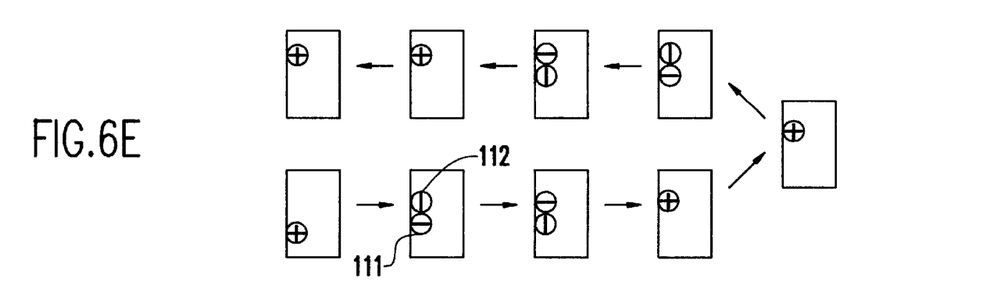

O represents a light ray having a polarizing direction perpendicular to the crystal axis (ordinary ray) and O represents a light ray having a polarizing direction parallel with the crystal axis (extraordinary ray). FIG. 6(d) shows a locus of an incident light inputted from an optical fiber 10 in case of seeing the optical isolator in FIG. 6(a) from the side direction, and FIG. 6(e) shows a polarizing direction of the incident light inputted from the optical fiber 10 in case of seeing the optical isolator in FIG. 6(a) from the front direction.

The light inputted from the optical fiber 7 is transmitted through a lens 8 and inputted into the polarizer 1. As shown in FIG. 6(c), the light is separated into an extraordinary ray 111 and an ordinary ray 112 inside the polarizer 1. Their polarizing directions are turned by 90 degrees inside the Faraday rotator 3, so that the ordinary ray and the extraordinary ray are reversed to each other. After this, they are inputted into the polarizer 2 to be polarization-synthesized into a light and the light is totally reflected by the total reflection film 4. The reflected light is separated again into two polarized lights inside the polarizer 2 and they are inputted into the Faraday rotator 3 so that their polarizing directions are turned. After this, they are polarization-synthesized inside the polarizer 1 and outputted at a position shifted from the incident position in the extraordinary ray separating direction (upward in the figure). The outputted light is condensed on the optical fiber 10 through a lens 9. A light 113 inputted from the optical fiber 10 is shifted in the extraordinary ray separating direction (crystal axis direction) of the polarizer 1 and is not condensed on the optical fiber 7.

Figure 7:
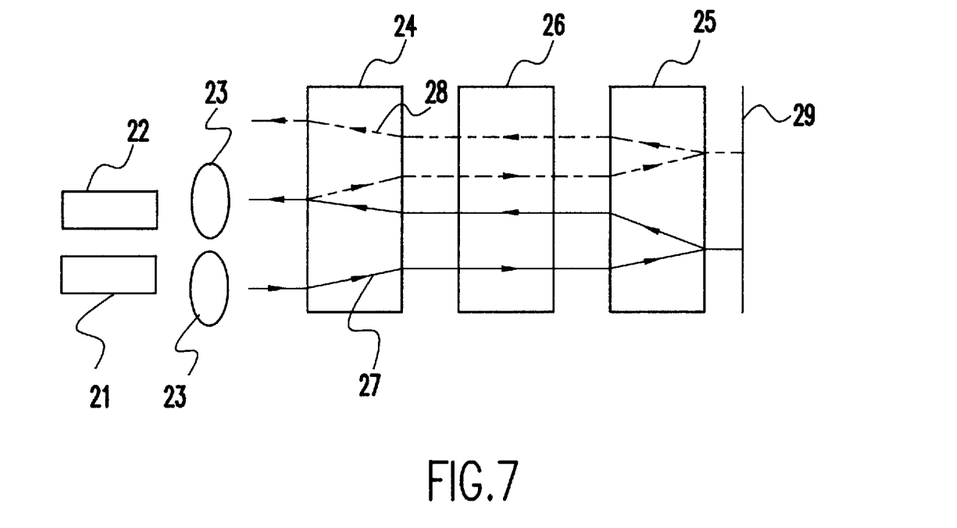
FIG. 7 is a figure showing configuration of an embodiment of a polarization-independent optical isolator composed of an optical passive device for an optical fiber amplifier of the invention.

FIG. 7 shows an embodiment in case of applying a polarization-independent optical isolator having a configuration according to the present invention shown in FIG. 6 to an optical component of pigtail type. Each of an input side optical fiber 21 and an output side optical fiber 22 is a single mode optical fiber and a lens 23 is a low-aberration lens of 3× in magnification and 20 mm in focal length. A material for a Faraday rotator 26 is gadolinium-bismuth substituted garnet and its thickness is adjusted so that an incident light polarizing direction may be turned by 90 degrees in optical wavelength of 1.550 um. A dielectric multilayered antireflection film is deposited on both side faces of the Faraday rotator 26.

Each of polarizers 24 and 25 is a rutile plate of 1.00 mm in thickness which has been cut at an angle of 47 degrees in relation to the crystal lifting axis (c-axis). The polarizers 24 and 25 are fixed in parallel with the Faraday rotator 26 and so that the extraordinary ray separating directions (crystal axis directions) of the two polarizers may be equal to each other. The polarizer 24 has an antireflection film deposited on both sides of it in the same way as the Faraday rotator 26. The polarizer 25 has an antireflection film deposited on the side facing the Faraday rotator 26 and a total reflection film 29 for the optical wavelength in use is deposited on the reverse side of it. An incident angle of a light ray from the optical fiber 21 to the polarizer 24 is 0 degree. For simplification, proceeding paths of the light rays in the figure are schematically shown.

An incident light 27 from the optical fiber 21 is transmitted through the polarizer 24, the Faraday rotator 26, and the polarizer 25, and is reflected by the total reflection film 29. Then the light 27 is transmitted again through the polarizer 25, the Faraday rotator 26, and the polarizer 24, and is condensed on the optical fiber 22. An incident light 28 from the optical fiber 22 is also transmitted through the polarizer 24, the Faraday rotator 26, and the polarizer 25, and is reflected by the total reflection film 29, and then the light 28 is transmitted again through the polarizer 25, the Faraday rotator 26, and the polarizer 24, and is outputted. Since the outputted light is shifted by about 400 um in the extraordinary light separating direction in relation to the incident light side optical fiber 21, the optical device functions as an optical isolator.

Figure 8:
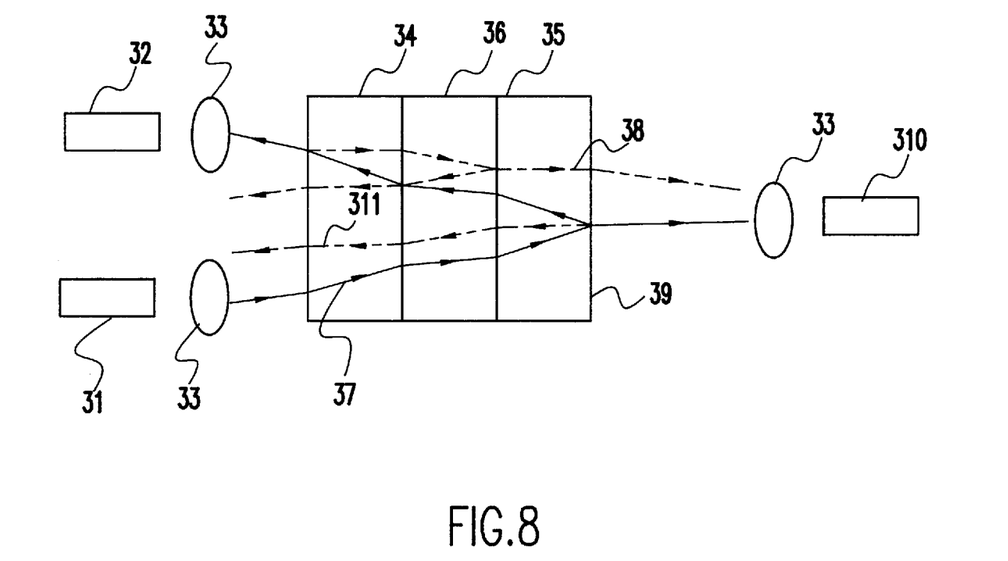
FIG. 8 is a figure showing configuration of another embodiment of a polarization-independent optical isolator composed of an optical passive device for an optical fiber amplifier of the invention.

Next, a second embodiment of a polarization-independent optical isolator having a configuration according to the present invention is described in the following. FIG. 8 is a figure showing the configuration of the second embodiment, which has the optical film 4 shown in FIG. 6 as an optical branching film of 10:1 and has a composite configuration where an optical isolator function, an optical branching function, and a line monitoring function are integrated.

Each of optical fibers 31 and 32 is a single mode optical fiber, a lens 33 is a low-aberration lens of 1.6 mm in focal length, and a receiving optical device 310 is a PIN photodiode. A material for a Faraday rotator 36 is gadolinium-bismuth substituted garnet and its thickness is adjusted so that an incident light polarizing direction may be turned by 90 degrees in optical wavelength of 1.550 um. A dielectric multilayered antireflection film is deposited on both side faces of the Faraday rotator 36.

Each of polarizers 34 and 35 is a rutile plate of 1.00 mm in thickness which has been cut at an angle of 47 degrees in relation to the crystal lifting axis (c-axis). The polarizers 34 and 35 are fixed in parallel with the Faraday rotator 36 and so that the extraordinary ray separating directions of the two polarizers 34 and 35 may be equal to each other. The polarizer 34 has an antireflection film deposited on both sides of it in the same way as the Faraday rotator 36. The polarizer 35 has an antireflection film deposited on the side facing the Faraday rotator 36 and has an optical branching film 39 having a branching ratio of 10:1, namely, a ratio of "reflected rays:branched rays=10:1," deposited on the reverse side of it. An incident angle of an incident light from the optical fiber 31 to the polarizer 34 is 5 degrees. For simplification, proceeding paths of the light rays in the figure are schematically shown.

An incident light 37 from the optical fiber 31 is transmitted through the polarizer 34, the Faraday rotator 36, and the polarizer 35, and is branched at a branching ratio of 10:1 by the optical branching film 39. Then the transmitted light is condensed on the receiving optical device 310, and the reflected light is transmitted again through the polarizer 35, the Faraday rotator 36, and the polarizer 34, and is condensed on the optical fiber 32. An incident light 38 from the optical fiber 32 is also outputted through the polarizers 34 and 35, the optical branching film 39, and the Faraday rotator 36. Needless to say that the transmitted light is not condensed on the incident light side optical fiber 31, since the reflected light is shifted by about 400 um in the extraordinary light separating direction in relation to the incident light 37, the reflected light also is not condensed on the incident light side optical fiber 31. The incident light from the optical fiber 31 and a reflected returning light 311 from the end face of the receiving optical device 310 also are outputted as being shifted by about 200 um in the extraordinary ray separating direction in relation to the incident light 37. Therefore, since they are not condensed on the optical fiber 31, this embodiment functions as an optical isolator built-in line monitor.

In the existing example shown in FIG. 3, an incident angle of a light ray to the optical branching film is as much as about 45 degrees, and a polarization dependency of transmittance and reflectance of the optical branching film is great. And in order to reduce the polarization dependency, it is necessary to adopt a specially-designed and expensive optical branching film. On the other hand, in this embodiment, since an incident angle of a light ray to the optical branching film is as small as a few degrees or less, a polarization dependency of transmittance and reflectance of the optical branching film is a little. Therefore, this embodiment makes it possible to manufacture a high-performance optical component by means of an inexpensive film.

Figure 9:
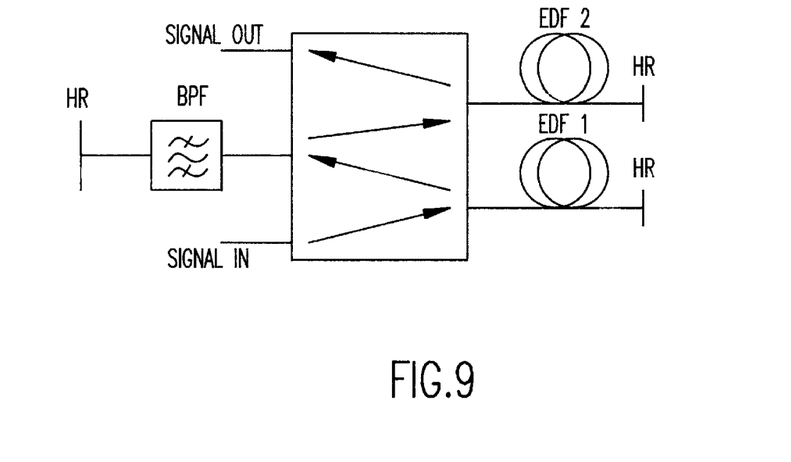
FIG. 9 is a figure showing configuration of an embodiment of a polarization-independent optical circulator composed of an optical passive device for an optical fiber amplifier of the invention.

FIG. 9 shows configuration of an embodiment of an optical circulator of the invention. The configuration shown in FIG. 9 uses the optical film 4 in FIG. 6 as an antireflection film and is applied to an optical circulator of five ports. Each of optical fibers 41, 42, 410, 420, and 430 is a single mode optical fiber, and a lens 43 is a low-aberration lens of 1.6 mm in focal length.

A material for a Faraday rotator 46 is gadolinium-bismuth substituted garnet and its thickness is adjusted so that its polarizing direction may be turned by 90 degrees in optical wavelength of 1.550 um. A dielectric multilayered antireflection film is deposited on both side faces of the Faraday rotator 46. Each of polarizers 44 and 45 is a rutile plate of 1.00 mm in thickness which has been cut at an angle of 47 degrees in relation to the crystal lifting axis (c-axis). The polarizers 44 and 45 are fixed in parallel with the Faraday rotator 46 and so that the extraordinary ray separating directions of the two polarizers 44 and 45 may be equal to each other. The polarizers 44 and 45 have respectively an antireflection film deposited on both sides of them in the same way as the Faraday rotator 46. An incident angle of an incident light from the optical fiber 41 to the polarizer 44 is 0 degree. For simplification, proceeding paths of the light rays in the figure are schematically shown.

An incident light 47 from the optical fiber 41 is transmitted through the polarizer 44, the Faraday rotator 46, and the polarizer 45, and is condensed on the optical fiber 42. An incident light 48 from the optical fiber 32 is also outputted through the polarizers 44 and 45, and the Faraday rotator 46. Since the transmitted light is shifted by about 200 um in the extraordinary ray separating direction in relation to the incident light, the transmitted light is not condensed on the optical fiber 41 but is condensed on the optical fiber 410. In the same manner, the incident light from the optical fiber 410 is condensed on the optical fiber 420 and the incident light from the optical fiber 420 is condensed on the optical fiber 430.

Figure 10:
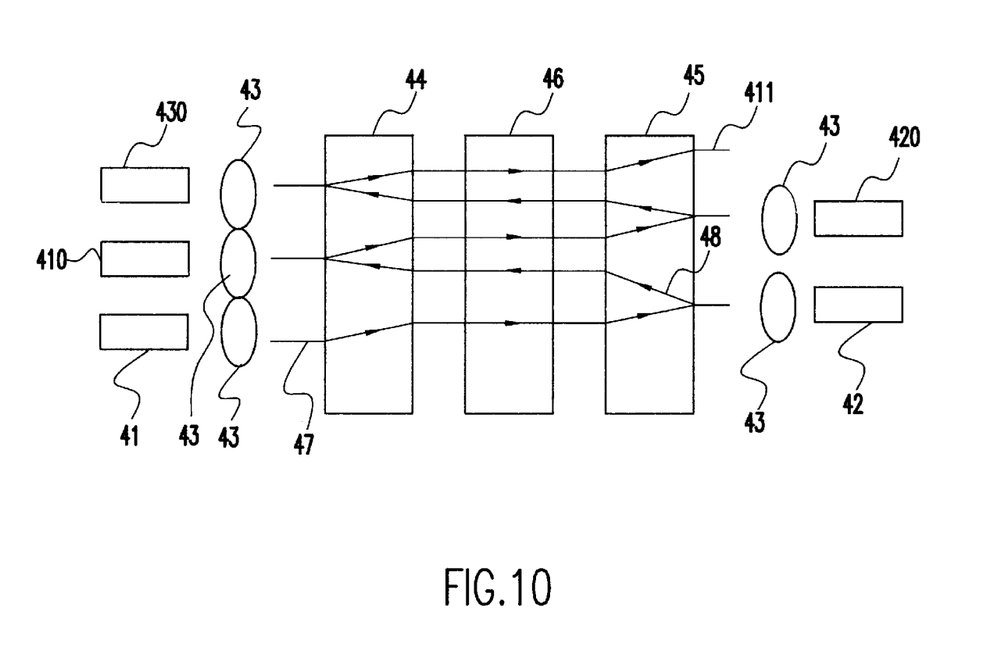
FIG. 10 is a figure showing configuration of an embodiment of an optical circulator composed of an optical passive device for an optical fiber amplifier of the invention.

Since an incident light 411 from the optical fiber 430 also is shifted by about 200 um in the extraordinary ray separating direction, it is not condensed on the optical fibers 41, 42, 410, and 420. Therefore, this embodiment functions as an optical circulator for circulating a light from the optical fiber 41 to the optical fiber 42, from the 42 to the 410, from the 410 to the 420, and from the 420 to the 430. FIG. 10 shows a case of applying this embodiment to an optical fiber amplifier, and FIG. 1 shows a case of composing an optical fiber amplifier having the same circuit configuration as FIG. 10 by means of existing optical components.

In case of composing the optical fiber amplifier shown in FIG. 10 by means of existing optical components, five optical components are needed. On the other hand, in case of applying an optical circulator of the present invention, since it can do with two optical components, it is possible to make an optical fiber amplifier smaller in size and more inexpensive in cost.

Figure 11:
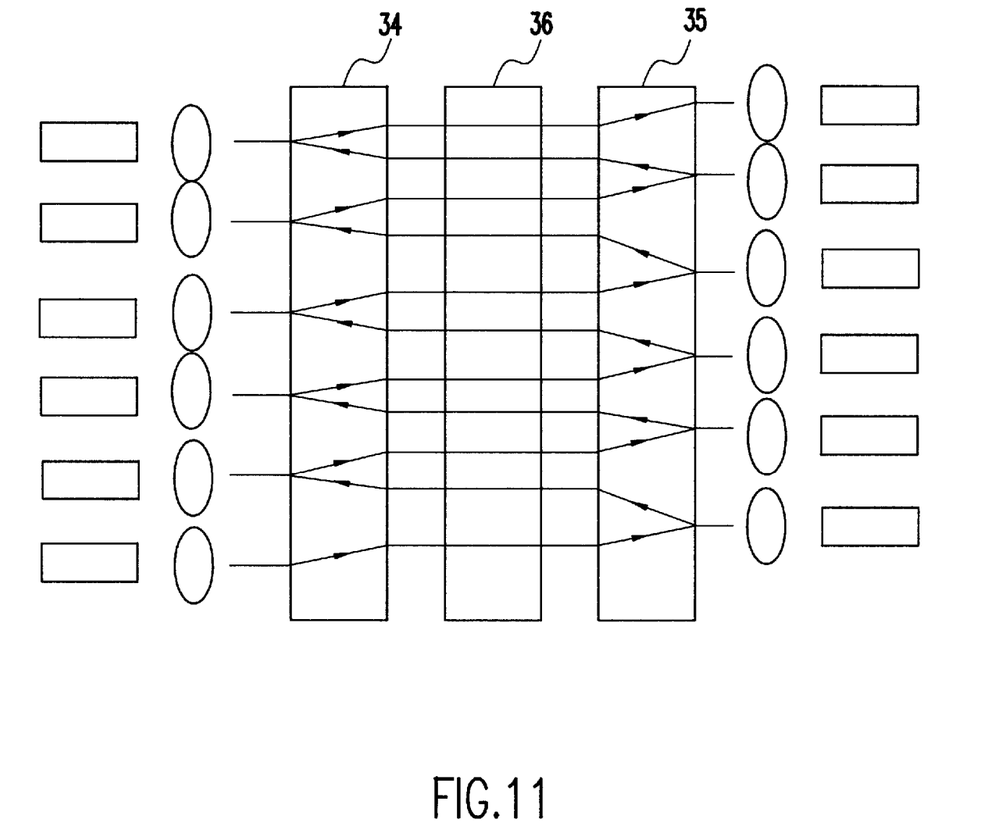
FIG. 11 is a figure showing configuration of another embodiment of an optical circulator composed of an optical passive device for an optical fiber amplifier of the invention.

The embodiment shown in FIG. 9 shows an optical circulator having five input/output optical fibers. According to the same technique, it is possible to increase the number of input/output optical fibers at will. As an example, this technique can be applied to a multi-port optical circulator array as shown in FIG. 11.

A multistage-connected erbium-doped fiber system can be made small by applying an optical circulator according to configuration of an optical passive device for an optical fiber amplifier of the present invention. Returning to FIG. 9, it is possible to dispose the erbium-doped fibers EDF1 and EDF2 at one side of the optical circulator and dispose optical input/output terminals for a signal light and an optical band-pass filter at the other side of it. According to an optical circulator shown in FIG. 11, it is possible to applying the invention to also a more multistage-connected fiber configuration.

As described above, a polarization-independent optical isolator according to the present invention is provided with a first birefractive crystal plate of parallel plate type whose crystal optical axis is inclined in relation to the optical axis of an incident light, and a second birefractive crystal plate of parallel plate type which is equal to the first birefractive crystal plate of parallel plate type in inclination of its crystal optical axis in relation to the optical axis of an incident light and in plate thickness. And the optical isolator is provided with a Faraday rotator which is disposed between the first and the second birefringent crystal plate of parallel plate type and turns by 90 degrees an incident linear polarized light which has the optical axis direction of the incident light and wavelength of the incident light. Both of input and output terminals are disposed at one side of the first birefringent crystal plate of parallel plate type which side is opposite to the second birefringent crystal plate of parallel plate type. Depending upon kinds of optical devices, it is possible to compose a small-sized polarization-independent optical isolator in which the optical devices can be used at any of reflection and transmission sides and the direction of the input/output optical fibers can be selected at will.

And an optical circulator according to the present invention is provided with a first birefractive crystal plate of parallel plate type whose crystal optical axis is inclined in relation to the optical axis of an incident light, and a second birefringent crystal plate of parallel plate type which is equal to the first refractive crystal plate of parallel plate type in inclination of the crystal optical axis inclined in relation to optical axis of an incident light and in plate thickness. And the optical circulator is provided with a Faraday rotator which is disposed between the first and the second birefringent crystal plate of parallel plate type and turns by 90 degrees an incident linear polarized light which has the optical axis direction of the incident light and wavelength of the incident light. It is possible to compose an optical circulator which can have an infinite number of input/output terminals instead of an existing optical circulator having input/output terminals limited to three or four.

The configuration of an optical device for an optical fiber amplifier of the invention is suitable directly for an optical fiber amplifier. However, it is a matter of course that the invention is not limited to this but it can be applied to various optical communication devices.

While this invention has been described in connection with certain preferred embodiments, it is to be understood that the subject matter encompassed by way of this invention is not limited to those specific embodiments. For example, where light of a second wavelength is to be transmitted through the multilayered thin film (e.g., the total reflection film or the bandpass transmission film), a third optical input/output terminal optically coupled to the second wavelength may be disposed at the side of the second birefringent parallel crystal plate. On the contrary, it is intended for the subject matter of the invention to include all alternative, modification and equivalents as can be included within the spirit and scope of the following claims.

What is claimed is:

1. An optical isolator comprising:

a first optical input/output terminal;

a first birefringent parallel crystal plate, said first birefringent parallel crystal plate having a crystal optical axis inclined in relation to the optical axis of an incident light inputted from said first optical input/output terminal, said first birefringent parallel crystal plate further outputting a linear polarized light through doubly refracting said incident light;

a second birefringent parallel crystal plate being equal to said first birefringent parallel crystal plate in inclination of the crystal optical axis in relation to the optical axis of said incident light and in plate thickness, said second birefringent parallel crystal plate further doubly refracting the inputted light;

a Faraday rotator being disposed between said first and said second birefringent parallel crystal plates, said Faraday rotator turning said linear polarized light transmitting through said first birefringent parallel crystal plate by 90 degrees;

a dielectric multilayered thin film formed on the surface of the second birefringent parallel crystal plate, said dielectric multilayered thin film outputting a reflected light by reflecting the incident light, and a second optical input/output terminal being positioned where the output reflected light is optically coupled through at least said first and second birefringent parallel crystal plates.

2. An optical isolator as defined in claim 1, wherein said dielectric multilayered thin film is a film formed on the surface of the birefringent parallel crystal plate composing said second birefringent parallel crystal plate.

3. An optical isolator as defined in claim 1, wherein:

said dielectric multilayered thin film reflects a light of $\lambda_1$ in wavelength and transmits a light of $\lambda_2$ in wavelength, and said optical isolator further comprising:

a third optical input/output terminal optically coupling to said light of $\lambda_2$ in wavelength and being disposed at the side of said second birefringent parallel crystal plate.

4. An optical isolator as defined in claim 1, wherein each said birefringent parallel crystal plate is a rutile crystal plate.

5. An optical circulator comprising;

a first birefringent parallel crystal plate, said first birefringent parallel crystal plate having a crystal optical axis being inclined in relation to the optical axis of an incident light;

a second birefringent parallel crystal plate being equal to said first birefringent parallel crystal plate in inclination of its crystal optical axis in relation to the optical axis of said incident light and in plate thickness;

a Faraday rotator being disposed between said first and said second birefringent parallel crystal plates, said Faraday rotator turning a linear polarized light by 90 degrees, a (2n−1)th optical input/output terminal being disposed at the side of said first birefringent parallel crystal plate and opposing said second birefringent parallel crystal plate, wherein n is a natural number; and a (2n)th optical input/output terminal being disposed at the side of the second birefringent parallel crystal plate.

6. An optical circulator comprising;

a first birefringent parallel crystal plate, said first birefringent parallel crystal plate having a crystal optical axis being inclined in relation to the optical axis of an incident light;

a second birefringent parallel crystal plate being equal to said first birefringent parallel crystal plate in inclination of its crystal optical axis in relation to the optical axis of said incident light and in plate thickness;

a Faraday rotator being disposed between said first and said second birefringent parallel crystal plates, said Faraday rotator turning a linear polarized light by 90 degrees; and a total reflection film being formed at the side of said second birefringent parallel crystal plate opposing said Faraday rotator side, wherein every optical input/output terminal of said circulator is disposed at the side of said first birefringent parallel crystal plate.

7. An optical circulator as defined in claim 4 further comprising:

a plurality of rare-earth doped optical fibers connecting to (2n) optical input/output terminals of said circulator;

an optical signal input connecting to first optical input/output terminal out of (2n−1)th optical input/output terminals; and an optical signal output connecting to the last optical input/output terminal out of said (2n−1)th optical input/output terminals.

8. An optical fiber amplifier as defined in claim 7, comprising:

an optical band-pass filter connecting to optical input/output terminals except said first and said last optical input/output terminal out of said (2×n−1) optical input/output terminals, and further transmitting a light having wavelength of a signal light; and a light reflecting means being disposed at the side of said optical band-pass filter opposing the side where said optical circulator is connected.

* * * * *